(12) United States Patent
Wang

(10) Patent No.: US 8,164,896 B1
(45) Date of Patent: Apr. 24, 2012

(54) ELECTRONIC APPARATUS

(75) Inventor: Chih-Kai Wang, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 12/969,034

(22) Filed: Dec. 15, 2010

(30) Foreign Application Priority Data

Nov. 16, 2010 (TW) ................................ 99222130 U

(51) Int. Cl.
*G06F 1/16* (2006.01)
*H05K 5/00* (2006.01)
*H05K 7/00* (2006.01)
(52) U.S. Cl. ............................... 361/679.35; 361/679.33
(58) Field of Classification Search ............. 361/679.01, 361/679.02, 679.33–679.39, 679.55
See application file for complete search history.

(56) References Cited

U.S. PATENT DOCUMENTS

| | | | | |
|---|---|---|---|---|
| 5,124,887 A * | 6/1992 | Kobayashi | ............... | 361/679.39 |
| 5,572,402 A * | 11/1996 | Jeong | ....................... | 361/679.31 |
| 5,784,251 A * | 7/1998 | Miller et al. | ............... | 361/679.6 |
| 6,064,567 A * | 5/2000 | Cheng | ....................... | 361/679.31 |
| 6,388,876 B1 * | 5/2002 | Chen | ....................... | 361/679.33 |
| 6,392,875 B1 * | 5/2002 | Erickson et al. | ......... | 361/679.32 |
| 6,563,701 B1 * | 5/2003 | Peng et al. | ............... | 361/679.34 |
| 6,580,603 B1 * | 6/2003 | Resnick | ..................... | 361/679.59 |
| 6,731,500 B2 * | 5/2004 | Allirot | ....................... | 361/679.34 |
| 7,375,959 B2 * | 5/2008 | Chang | ....................... | 361/679.33 |
| 7,502,224 B2 * | 3/2009 | Motoe | ....................... | 361/679.33 |
| 7,529,084 B2 * | 5/2009 | Liao et al. | ................. | 361/679.33 |
| 7,667,960 B2 * | 2/2010 | Miyairi | ..................... | 361/679.34 |
| 2002/0067592 A1 * | 6/2002 | Horiuchi et al. | ............... | 361/685 |
| 2003/0174464 A1 * | 9/2003 | Funawatari et al. | .......... | 361/685 |
| 2005/0111202 A1 * | 5/2005 | Minaguchi et al. | ........... | 361/752 |
| 2005/0287852 A1 * | 12/2005 | Sugawara et al. | ............. | 439/135 |
| 2006/0061954 A1 * | 3/2006 | Lam | ............................... | 361/685 |
| 2007/0205010 A1 * | 9/2007 | Chen et al. | ...................... | 174/50 |
| 2007/0253101 A1 * | 11/2007 | Miyairi | ..................... | 360/97.01 |
| 2007/0263351 A1 * | 11/2007 | Ho et al. | ........................ | 361/685 |
| 2008/0165486 A1 * | 7/2008 | Chen et al. | ...................... | 361/683 |
| 2008/0239651 A1 * | 10/2008 | Curnalia et al. | .............. | 361/685 |
| 2009/0009955 A1 * | 1/2009 | Motoe | .......................... | 361/685 |
| 2009/0040693 A1 * | 2/2009 | Tanaka | ........................ | 361/679 |
| 2009/0040702 A1 * | 2/2009 | Tanaka et al. | ................. | 361/681 |

FOREIGN PATENT DOCUMENTS

| | | |
|---|---|---|
| TW | M278998 | 10/2005 |
| TW | M289962 | 4/2006 |
| TW | M366739 | 10/2009 |

* cited by examiner

*Primary Examiner* — Jinhee Lee
*Assistant Examiner* — Adrian S Wilson
(74) *Attorney, Agent, or Firm* — WPAT., P.C.; Justin King

(57) ABSTRACT

An electronic apparatus is disclosed, which comprises: a casing, a cap, a data storage unit and an ejecting module. The casing has an accommodation space formed by the enclosure of two sidewalls of the casing. The accommodation space is further configured with an opening that can be covered by the cap so as to seal the accommodation space. The ejecting module is comprised of: a holder, pivotally coupled to one of the two sidewalls while clamping the data storage unit; and a first elastic element, disposed at a position for allowing the same to be compress when the opening is covered by the cap, and consequently, enabling the first elastic element to be released from the compression when the cap is removed from the opening, and thus bringing along the holder to rotate in a specific direction for lifting and exposing the data storage unit out of the accommodation space.

9 Claims, 4 Drawing Sheets

ELECTRONIC APPARATUS

FIELD OF THE INVENTION

The present invention relates to a structure for electronic apparatus, and more particularly, to an electronic apparatus capable of inducing a built-in data storage unit to be lifted and thus exposed automatically by the opening of its cap.

BACKGROUND OF THE INVENTION

Nowadays, computer is becoming an essential tool for almost every profession. However, operating under various conditions including computer virus invasion, demands for storing huge amount of data in a flash, collision, getting shorted out by water, erroneous or even hazard operation behaviors, and so on, it is very likely to cause the data storage apparatus in the computer, such as a hard disk drive (HDD), to malfunction and thus the process for detaching the data storage apparatus from the computer so as to be repaired or replaced can be very common.

Taking the detaching of a data storage apparatus out of a common notebook computer for example, the data storage apparatus can only be removed after several screws had been loosened first for opening the casing of the notebook computer, and then the frame inside the computer casing that is used for holding the data storage apparatus had been detached. Not to mention that after the detached data storage apparatus had been repaired, or in a condition that it can not be repaired and has to be replaced by a new data storage apparatus, the aforesaid process has to be performed once again but in reverse for assembly. Nevertheless, such detaching and assembly process can be very time consuming and inconvenient for not only the manufacturers, but also the users.

There are already many structures for overcoming the aforesaid problem. One of which is an external electronic data storage device, disclosed in TW Pat. Pub. No. M278998. The external electronic data storage device is composed of a frame and a case, in which the frame is constructed with an accommodation space, whereas the accommodation space is formed with an opening on the top thereof and is configured with a power adapter and an interface connector at the rear thereof. The power adapter is spaced from the interface connecter by a specific distance. Moreover, the two sides near an inner end of the case are axially coupled to two sidewalls of the accommodation space in respective while the outer end of the case is constructed with an inlet provided for a HDD to insert into the frame therethrough. In a preferred embodiment, the case is further configured with a handle, by that the case can be pull to move upward from the opening of the frame while being rotated and tilted for facilitating a HDD to be conveniently inserted into the case while enabling the power jack and the interface terminal to connect respectively to the power adapter and the interface connecter, and then, the case is rotated again so as to be received inside the accommodation. Thereby, it is a much easier task for an engineer to assemble/detach a HDD.

Another such structure is a fixing apparatus for hard disk drive, disclosed in TW Pat. Pub. No. M289962, which comprises a connecting seat; a stationary bracket, fixedly connected to the connecting seat; and a movable bracket, movably coupled to the connecting seat and capable of being coupled to the stationary bracket by the clipping of a connecting panel. Moreover, both the stationary bracket and the movable bracket are configured with hooks designed to lock on to the holes formed on two sides of a HDD. With the aforesaid structure, the movable bracket can be driven to pivot toward the stationary bracket for allowing the movable bracket to couple with the stationary bracket by the connecting panel, by that the hooks of the two brackets are enabled to lock on to the corresponding holes of the HDD so as to fixedly secured the HDD in a space defined between the stationary bracket and the movable bracket. Thereby, the HDD can be detach or assembly rapidly and easily without any use of tools or screws.

Although by the aforesaid structures, the process for detaching or assembling a data storage apparatus can be greatly simplified, there is still a lot to be improved, especially for the construction of a thinner, lighter and smaller notebook computer with lower manufacturing cost, since the data storage apparatus in those aforesaid structures is generally being received inside a case or mounted on a structure of a stationary bracket and a movable bracket that it is required to have a process for enabling the case or the movable bracket to pivot before the data storage apparatus can be detached or assembled.

SUMMARY OF THE INVENTION

In view of the disadvantages of prior art, the object of the present invention is to provide an electronic apparatus, formed with an accommodation space and a ejecting module adapted to be received inside the accommodation space, and capable of using an elastic element of the ejecting module to open a cap of the electronic apparatus, and consequently bringing along a data storage unit that is fitted inside the ejecting module to be lifted and thus exposed automatically.

To achieve the above object, the present invention provides an electronic apparatus, which comprises: a casing, a cap, a data storage unit and an ejecting module. The casing has an accommodation space formed by the enclosure of two sidewalls of the casing. The accommodation space is further configured with an opening that can be covered by the cap so as to seal the accommodation space. The data storage unit is received inside the accommodation space. The ejecting module is further comprised of: a holder, pivotally coupled to one of the two sidewalls while clamping the data storage unit; and a first elastic element, having a free end movably coupled to the holder and a fixed end connected to the casing, disposed at a position for allowing the same to be compress when the opening is covered by the cap, and consequently, enabling the first elastic element to be released from the compression when the cap is removed from the opening, while bringing along the holder to rotate in a specific direction.

Operationally, when the cap is removed from the opening, the resilience of the first elastic element will force the holder to pivot in the specific direction and thus bring along the data storage unit to be lifted and exposed out of the accommodation space. Thereby, the data storage unit can be detached rapidly and conveniently.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
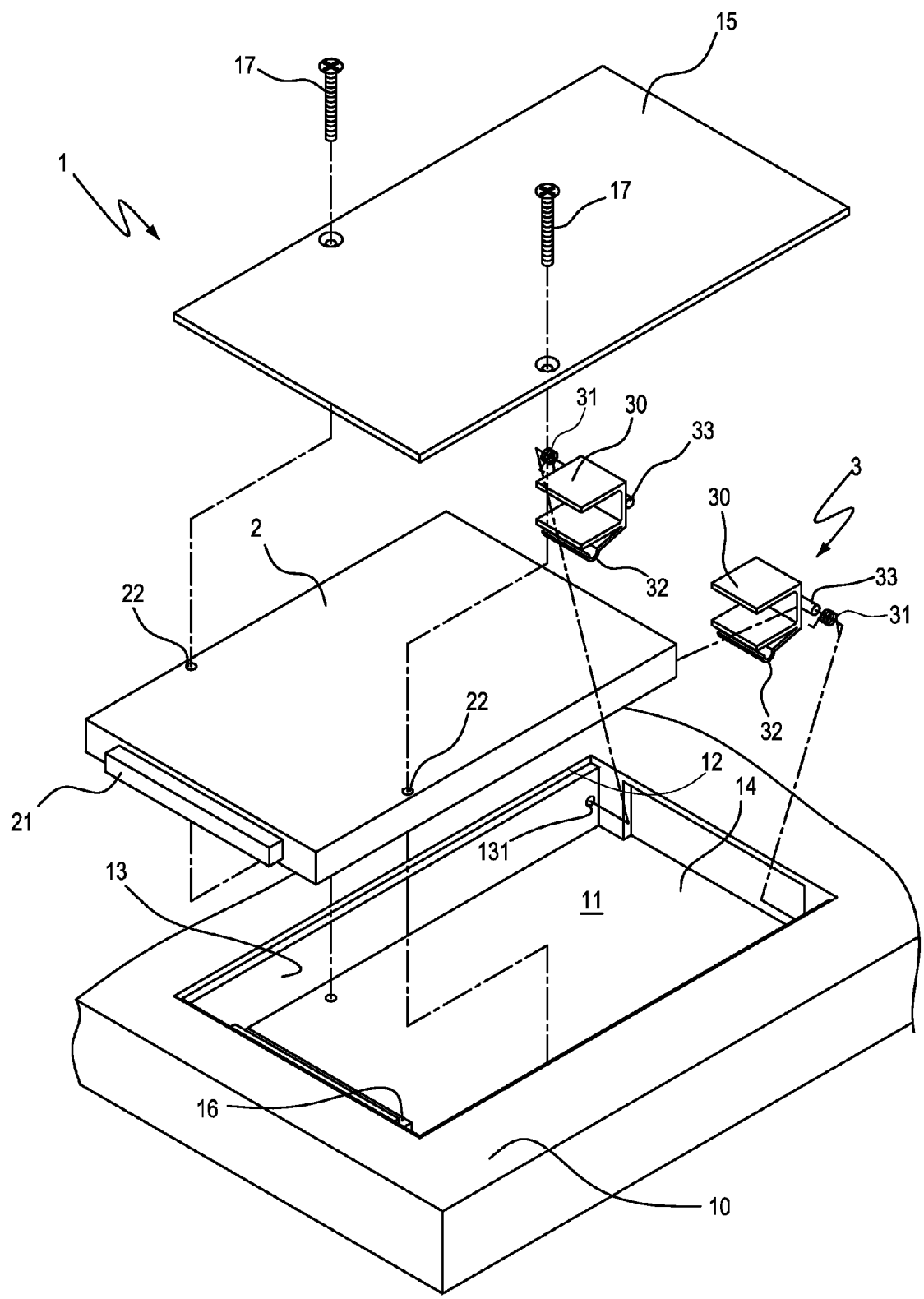
FIG. 1 is a three-dimensional diagram showing an electronic apparatus according to a first embodiment of the present invention.
Figure 2:
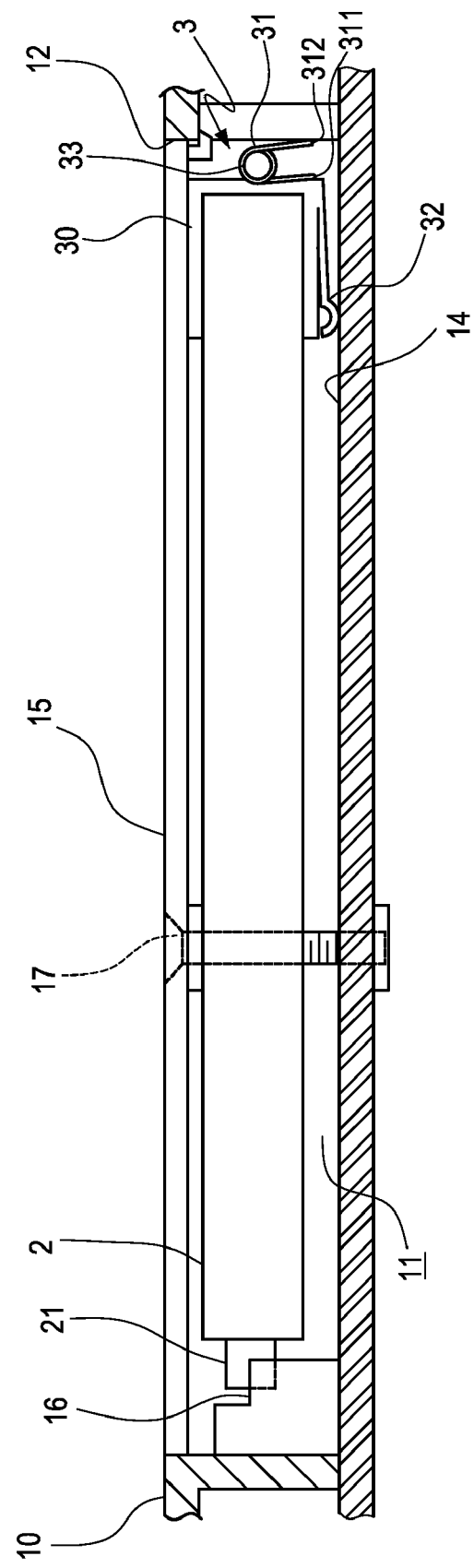
FIG. 2 is a partial cross sectional view of an electronic apparatus of the first embodiment of the present invention.
Figure 3:
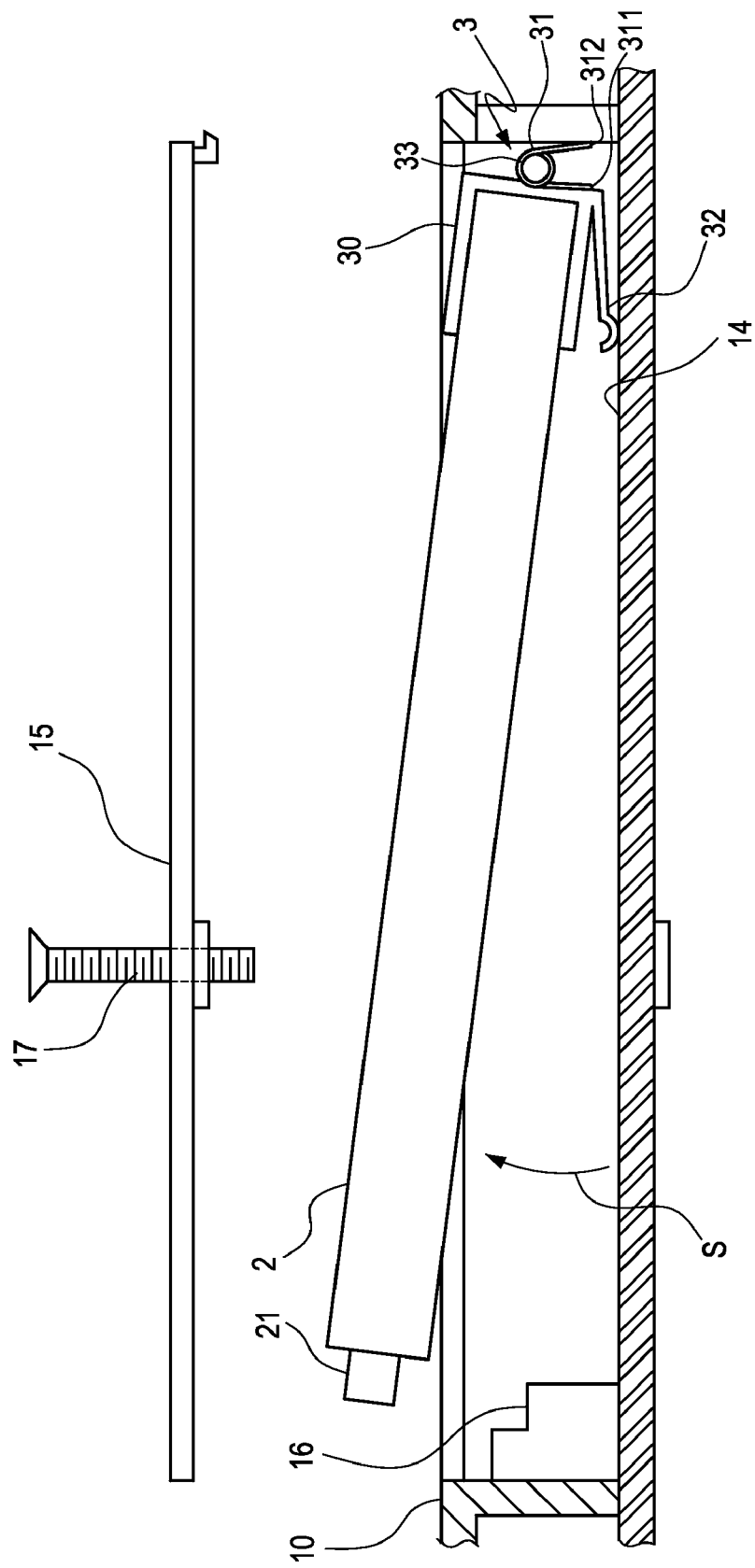
FIG. 3 is a schematic diagram showing an operating electronic apparatus of the first embodiment of the present invention.

Please refer to FIG. 1 to FIG. 3, which are a three-dimensional diagram showing an electronic apparatus of a first embodiment of the present invention; a partial cross sectional view of an electronic apparatus of the first embodiment; and a schematic diagram showing an operating electronic apparatus of the first embodiment.

As shown in FIG. 1, the electronic apparatus 1 has a casing 10, which is formed with an accommodation space 11 for receiving a data storage unit 2. The accommodation space 11, being formed with an opening 12, is enclosed between two sidewalls 13 of the casing 10 that are respectively disposed at positions corresponding to two sides of the accommodation space 11. Moreover, the casing 10 further comprises a supporting panel 14, which is disposed on a surface of the casing 10 that is away from the opening 12. In addition, the electronic apparatus 1 further comprises a cap 15, arranged at a position corresponding to the opening 12 of the accommodation space 11 for covering the same, thus, the accommodation space 12 can be sealed after the opening 12 is covered by the cap 15.

As shown in FIG. 1 to FIG. 3, the data storage unit 2 is fitted into the accommodation space 11 by the use of an ejecting module 3. Moreover, the data storage unit 2 is configured with a connector 21, and the casing 10 of the electronic apparatus 1 is configured with an adapter 16 inside its accommodation space 11 at a position corresponding to the connector 21, by that the data storage unit 2 is able to connect electrically to the electronic apparatus 1.

Figure 4:
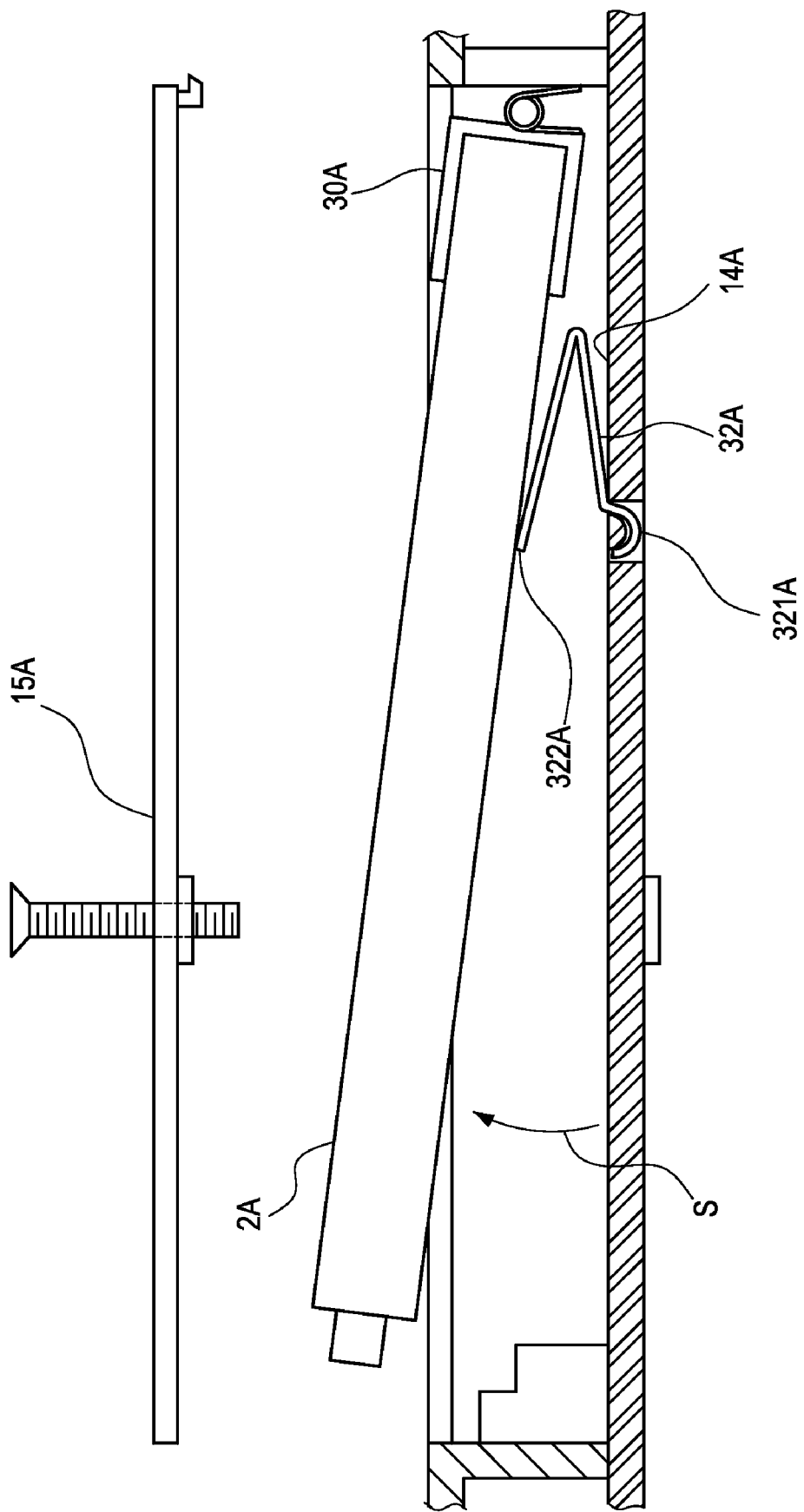
FIG. 4 is a cross sectional view of an electronic apparatus according to a second embodiment of the present invention.

The ejecting module is configured with at least one holder 30 and at least one first elastic element 31. In the embodiment of FIG. 1, there are two holders 30 and two first elastic elements 31, but it is only for illustration and but is not limited thereby. As shown in FIG. 1, the holders 30 are used for clamping the data storage unit 2 while being pivotally coupled to the sidewalls 13. Each of the first elastic elements 31, being substantially a torsion spring in FIG. 1, is movably connected to its corresponding holder 30 by a free end 311 thereof, while being connected to the casing 10 by its fixed end 312. Thereby, each of the first elastic elements 13 is compressed when the opening 12 is covered by the cap 15, whereas each of the first elastic elements 31 is released from the compression when the cap 15 is removed from the opening 12, and thus bringing along the holders 30 to rotate in a specific direction, as indicated by the arrows S shown in FIG. 3 and FIG. 4.

In the embodiment shown in FIG. 1 to FIG. 3, the electronic apparatus 1 is substantially a notebook computer, and the accommodation space 11 formed therein is a rectangle-shaped space, accordingly that there are four sidewalls 13 being disposed respectively at the four sides of the rectangle-shaped accommodation space 11, and thus the supporting panel 14 of the casing 10 is in contact simultaneously with the four sidewalls 13. As there are two holders 30 in the embodiment of FIG. 1, each of the two sidewalls 13 that provided for the two holders 30 to coupled to are formed with a pivot holes 131 at a positions thereof that is away from the adapter 16 and corresponding to the holders 30, and each of the two holders 30 is configured with a pivot shaft 33, and thus, by fitting the pivot shafts 33 into their corresponding holes 131, the holders 30 can be pivotally mounted on the two sidewalls 13 in respective. As shown in FIG. 1 to FIG. 3, each of the holders 30 is formed as an U-shaped element that is designed to clamp the data storage unit 2 at an area thereof away from the connector 21. In addition, the two elastic elements 31 are disposed respectively at the joints of the pivot shafts 33 and the casing 10.

Moreover, the ejecting module 3 is further comprised of: at least one second elastic element 32. In the embodiment shown in FIG. 1 to FIG. 3, each second elastic element 32 is integrally formed with one corresponding holder 30 as an extension thereof extending from a surface proximate to the supporting panel 14. Operationally, each second elastic element 32 is compressed when the opening 12 is covered by the cap 15, and is capable of being released from the compression when the cap 15 is removed from the opening 12, and thus bringing along the holder to rotate in the specific direction S.

In addition, as the cap 15 is designed to be fixed by the use of two screw bolts 17, the data storage unit 2 is configured with two via holes 22 at positions corresponding to the screw blots 17, that are provided for the screw blots 17 to bore through and thus fixed to the casing 10.

As an end of the data storage unit 2 in the present invention is clamped by the holders 30 of the ejecting module 3 while allowing the free end 311 of each first elastic element 31 to engage with the its corresponding holder 30, whereas each holder 30 is configured with a second elastic element 32 extending from a surface thereof proximate to the supporting panel 14, the data storage unit 2 is situated in a status that it will be pressed toward the supporting panel 14, bringing along each of first and the second elastic elements 31, 32 to be compressed, when the opening 12 is covered by the cap 15, and thus the connector 21 configured on the data storage unit 2 is move to connect electrically with the adapter 16, as the embodiment shown in FIG. 2.

However, when the screw bolts 17 are loosened and the cap 15 is removed, each of the first and second elastic elements 31, 32 will be released from the compression, the holders 30 will be pushed by the resilience of the first and second elastic elements 31, 32 to pivot about the pivot shafts 33 in the specific direction S, and thus the data storage unit 2 is lifted in a manner that an end of the data storage unit 2 that is away form the holders 30, i.e. the end where the connector 21 is disposed, is exposed outside the accommodation space 11. Therefore, the data storage unit 2 can easily be accessed by users or maintenance engineers, so that the data storage unit 2 can be detached rapidly and conveniently Please refer to FIG. 4, which is a cross sectional view of an electronic apparatus according to a second embodiment of the present invention. In this embodiment, each of the second elastic elements 32A is formed as a V-shaped element which is connected to the supporting panel 14A by its fixed end 321A while abutting against to the bottom of the data storage unit 2A by its free end 322A. Thereby, each second elastic element 32A is compressed when the opening 12A is covered by the cap 15A, while each capable of being released from the compression when the cap 15A is removed from the opening 12A, and thus bringing along the holder to rotate in the specific direction S for achieving the same effect as the first embodiment.

In addition to the foregoing configurations, the holder can be formed as a clamp in a width almost equal to that of the data storage unit that can be used for replacing the two U-shaped holders 30 in the first embodiment for achieving the same effect.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. An electronic apparatus, which comprises:
    a casing, having at least one accommodation space formed therein in a manner that each accommodation space is formed with an opening and is enclosed between two sidewalls of the casing that are respectively disposed at positions corresponding to two sides of the accommodation space;
    a cap, for covering the opening so as to seal the at least one accommodation space;
    a data storage unit, being received inside the at least one accommodation space; and
    an ejecting module, further comprised of:
        at least one holder, pivotally coupled to the casing while clamping the data storage unit;
        at least one first elastic element, having a free end movably coupled to the holder and a fixed end connected to the casing; and
        at least one second elastic element, being arranged for enabling itself to be compressed when the opening is covered by the cap, while capable of being released from the compression when the cap is removed from the opening;
    wherein, the first elastic element and the at least one second elastic element are compressed when the opening is covered by the cap, and the first elastic element and the at least one second elastic element are released from the compression when the cap is removed from the opening, bringing along the holder to rotate in a specific direction, and the at least one second elastic element is a spring piece, being integrally formed with the holder as an extension thereof.

2. The electronic apparatus of claim 1, wherein the at least one first elastic element is a torsion spring.

3. The electronic apparatus of claim 1, wherein the at least one holder is formed as an U-shaped element for facilitating the clamping of the data storage unit.

4. The electronic apparatus of claim 1, wherein each of the two sidewalls is formed with a pivot hole at a position corresponding to a pivot shaft configured on the at least one holder for enabling the at least one holder to be pivotally mounted on the two sidewalls.

5. The electronic apparatus of claim 4, wherein the first elastic element is arranged at the joint of the pivot shaft and the casing.

6. The electronic apparatus of claim 1, wherein the casing further comprises:
    a supporting panel, disposed on a surface of the casing that is away from the opening while allowing a fixed end of the at least one second elastic element to connect to the supporting panel, and allowing a free end of the at least one second elastic element to connect to the casing.

7. The electronic apparatus of claim 1, wherein the data storage unit is configured with a connector; the casing is configured with an adapter inside its accommodation space at a position corresponding to the connector; and the holder is arranged for clamping the data storage unit at an area thereof away from the connector.

8. The electronic apparatus of claim 1, wherein the cap is configured to be fixed by at least one screw bolt; and the data storage unit is configured with a via hole at a position corresponding to the at least one screw bolt so as to be bored through by the screw bolt.

9. An electronic apparatus, comprising:
    a casing, having at least one accommodation space formed therein in a manner that each accommodation space is formed with an opening and is enclosed between two sidewalls of the casing that are respectively disposed at positions corresponding to two sides of the accommodation space;
    a supporting panel, disposed on a surface of the casing opposite the opening;
    a cap, for covering the opening so as to seal the at least one accommodation space;
    a data storage unit, being received inside the at least one accommodation space; and
    an ejecting module, further comprised of:
        at least one holder, pivotally coupled to the casing while clamping the data storage unit;
        at least one first elastic element, having a free end movably coupled to the holder and a fixed end connected to the casing; and
        at least one second elastic element, being arranged for enabling itself to be compressed when the opening is covered by the cap, while capable of being released from the compression when the cap is removed from the opening;
    wherein, the first elastic element and the at least one second elastic element are compressed when the opening is covered by the cap, and the first elastic element and the at least one second elastic element are released from the compression when the cap is removed from the opening, bringing along the holder to rotate in a specific direction, and the at least one second elastic element is a spring piece, being integrally formed with the holder as an extension thereof;
    wherein, a fixed end of at least one second element connects to the supporting panel, and a free end of the second elastic element connects to the casing.

* * * * *